US008848654B2

(12) United States Patent
He et al.

(10) Patent No.: US 8,848,654 B2
(45) Date of Patent: Sep. 30, 2014

(54) METHODS OF HANDLING COVERAGE WITHIN A WIRELESS COMMUNICATIONS SYSTEM

(75) Inventors: Yu Jun He, Nanjing (CN); Steven Shio, Nanjing (CN); Hai Rong Xie, Nanjing (CN); Ming Bin Zheng, Nanjing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 2177 days.

(21) Appl. No.: 11/798,702

(22) Filed: May 16, 2007

(65) Prior Publication Data

US 2008/0159226 A1 Jul. 3, 2008

(30) Foreign Application Priority Data

Dec. 29, 2006 (CN) .......................... 2006 1 0172479

(51) Int. Cl.
*H04W 4/00* (2009.01)
*H04W 16/32* (2009.01)
(52) U.S. Cl.
CPC .................................... *H04W 16/32* (2013.01)
USPC ............................ 370/331; 455/436; 455/437
(58) Field of Classification Search
USPC ........................... 370/331–335; 455/436–444
See application file for complete search history.

(56) References Cited

U.S. PATENT DOCUMENTS

| 5,864,549 | A | * | 1/1999 | Honkasalo et al. | 370/335 |
| 5,982,759 | A | * | 11/1999 | Jo et al. | 370/331 |
| 5,987,013 | A | | 11/1999 | Kabasawa | |
| 6,070,075 | A | * | 5/2000 | Kim | 455/437 |
| 6,101,176 | A | * | 8/2000 | Honkasalo et al. | 370/335 |
| 6,188,906 | B1 | * | 2/2001 | Lim et al. | 455/453 |
| 6,400,952 | B2 | * | 6/2002 | Kim et al. | 455/436 |

(Continued)

FOREIGN PATENT DOCUMENTS

| EP | 1 555 847 | 7/2005 |
| JP | 9-284827 | 10/1997 |

OTHER PUBLICATIONS

Office Action for Japanese Application No. 2009-544027 mailed Jan. 5, 2012.

(Continued)

*Primary Examiner* — Nathan Taylor
(74) *Attorney, Agent, or Firm* — Harness, Dickey & Pierce

(57) ABSTRACT

A first pilot signal is transmitted at a first frequency for a first coverage area (e.g., an outdoor area). A second pilot signal is transmitted at a second frequency for a second coverage area (e.g., an indoor area). The first pilot signal at the second frequency is transmitted into a portion of the second coverage area, the second coverage area at least overlapping with the first coverage area. Further, the first pilot signal is transmitted at the second frequency in the second coverage area. In an example, the first pilot signal at the first frequency is transmitted from an outdoor base station, the second pilot signal at the second frequency is transmitted by an indoor base station, the first pilot signal at the second frequency is transmitted into the second coverage area (e.g., an interior of a building from a building exit point) by an antenna (e.g., not necessarily at a base station) and the second pilot signal at the first frequency is transmitted by the indoor base station. The pilot signal configuration discussed above may facilitate call handoffs between the first and second coverage areas. For example, if the first coverage area is an outdoor area and the second coverage area is a building interior, the example pilot signal configuration may reduce pilot pollution.

9 Claims, 4 Drawing Sheets

(56) References Cited

U.S. PATENT DOCUMENTS

| | | | |
|---|---|---|---|
| 6,424,834 B1* | 7/2002 | Chang et al. | 455/436 |
| 6,430,168 B1* | 8/2002 | Djurkovic et al. | 370/331 |
| 6,434,387 B1* | 8/2002 | Lee | 455/436 |
| 6,556,551 B1* | 4/2003 | Schwartz | 370/331 |
| 7,065,353 B1* | 6/2006 | Bolinth et al. | 455/426.1 |
| 7,139,580 B2* | 11/2006 | Stein et al. | 455/456.1 |
| 2002/0086675 A1 | 7/2002 | Mansour | |
| 2004/0151139 A1* | 8/2004 | Li et al. | 370/331 |
| 2005/0037757 A1* | 2/2005 | Moon et al. | 455/436 |

OTHER PUBLICATIONS

Office Action for Japanese Application No. 2009-544027 mailed Oct. 30, 2012.

\* cited by examiner

METHODS OF HANDLING COVERAGE WITHIN A WIRELESS COMMUNICATIONS SYSTEM

PRIORITY STATEMENT

This application claims priority under 35 U.S.C. §119 to Chinese Patent Application No. 200610172479.2, filed on Dec. 29, 2006 in the Chinese Patent Office (CPO), the disclosure of which is incorporated herein in its entirety by reference.

BACKGROUND OF THE INVENTION

1. Field of the Invention

Example embodiments of the present invention relate generally to handling coverage within a wireless communications system, and, more particularly, to methods of call handling based on pilot signals within a wireless communications system.

2. Description of the Related Art

In rural telecommunication systems, base stations are typically deployed so as to cover expansive, outdoor coverage areas. Building structures in rural areas are typically small enough such that a coverage area provided by the outdoor base station is sufficient to support and maintain a communication between indoor mobile users and the outdoor base stations.

In urban areas, however, buildings are built on a much larger scale than rural areas. Large buildings, such as office buildings, warehouses and skyscrapers, may reduce a coverage area provided from outdoor base stations within an interior of a building. Accordingly, indoor base stations are conventionally deployed within such buildings so that the coverage area of a telecommunications system may extend to interior sections of larger buildings.

In conventional code division multiple access (CDMA) systems, indoor and outdoor base stations typically serve mobile users over the same frequency, but with different Pilot Pseudo Noise (PN) Offsets. However, a phenomenon referred to as "pilot pollution" may arise due to the same-frequency implementation of indoor/outdoor base stations. Pilot pollution typically refers to a situation where the mobile received power is relatively high (e.g., a higher value of Ec), but the Ec/Io of the best pilot signal is relatively low. Pilot pollution makes the dominant pilot very unstable and thereby decreases the performance of the mobile. Conventional mobiles operating in accordance with CDMA may search for up to six (6) pilots to maintain in an Active Set (e.g., a set of base stations with pilot signal strengths sufficient to establish a connection) and up to 40 pilots to maintain in a Neighbor Set (e.g., a set of base stations adjacent to base stations within the active set).

A mobile user positioned within a polluted pilot area typically measures the signal strength of all available pilot signals and selects a base station associated with a strongest measured pilot signal. The mobile user then requests to set up a connection with (e.g., if not currently connected to a base station), or handoff to (e.g., if currently connected to a base station other than the selected base station), the selected base station. However, if the signal strength (Ec/Io) of the selected base station is relatively low due to pilot pollution, the call may not be stable. Within a building, certain "exposed" indoor areas may experience increased risk of pilot pollution. For example, higher-level floors in a tall office building may receive the outdoor pilot signal near windows or other exposed areas because the outdoor pilot signal may only be optimized for "street level" connections. Thus, outdoor pilot signals received at mobiles positioned on higher floors of high-rise buildings (e.g., near a window) may be unpredictable and inconsistent. If the mobile utilizes the outdoor carrier or base station to establish call setup or handoff, the call may not be stable and has a higher probability of dropping out. Another example of an exposed area in a building is an entrance and/or exit (e.g., typically positioned on a lower-level floor or lobby). Thus, mobile users may measure the received indoor and outdoor pilot signals in such exposed areas and request either call setup or handoff to the outdoor base station or the indoor base station.

However, the majority of the interior of the building is typically better served by the indoor base stations, while the majority of the exterior of the building is typically better served by the outdoor base station. Accordingly, in an example, if the mobile user connects to the outdoor base station in an exposed area when entering a building, there is a higher probability that the mobile user's call will be dropped if the mobile user moves further into the building and a handoff to the indoor base station is not quickly made. Similarly, in another example, if a mobile user connects to the indoor base station in an exposed area when exiting a building, there is a higher probability that the mobile user's call will be dropped if the mobile user moves further away from the building and a handoff to the outdoor base station is not quickly made.

SUMMARY OF THE INVENTION

An example embodiment of the present invention is directed to a method of pilot signal transmission within a wireless communications system, including first transmitting a first pilot signal at a first frequency for a first coverage area, second transmitting a second pilot signal at a second frequency for a second coverage area and third transmitting the second pilot signal at the first frequency in the second coverage area, the second coverage area at least overlapping with the first coverage area.

Another example embodiment of the present invention is directed to a method of pilot signal transmission within a wireless communications system, including first transmitting a first pilot signal at a first frequency for a first coverage area, second transmitting a second pilot signal at a second frequency for a second coverage area, the first coverage area at least overlapping with the second coverage area and third transmitting the first pilot signal at the second frequency into a portion of the second coverage area such that a signal strength of the first pilot signal at the second frequency increases as the portion is traversed from the second coverage area to the first coverage area.

Another example embodiment of the present invention is directed to a method of facilitating call handoff within a wireless communications system, including receiving a request from a mobile station to handoff from a first pilot at a first frequency to a second pilot at a first frequency, determining if the second pilot at the first frequency is a dummy pilot of the first frequency and sending instructions to the mobile station to handoff to the second pilot at a second frequency if the determining step determines that the second pilot at the first frequency is a dummy pilot of the first frequency.

BRIEF DESCRIPTION OF THE DRAWINGS

The present invention will become more fully understood from the detailed description given herein below and the accompanying drawings which are given by way of illustra

DETAILED DESCRIPTION OF EXAMPLE EMBODIMENTS

In order to better understand the present invention, an example communication system will be described, followed by an example of configuring the communication system according to an example embodiment of the present invention. Then, examples of call handoff processes will be described as performed within the configured communication system.

Communication System

Figure 1:
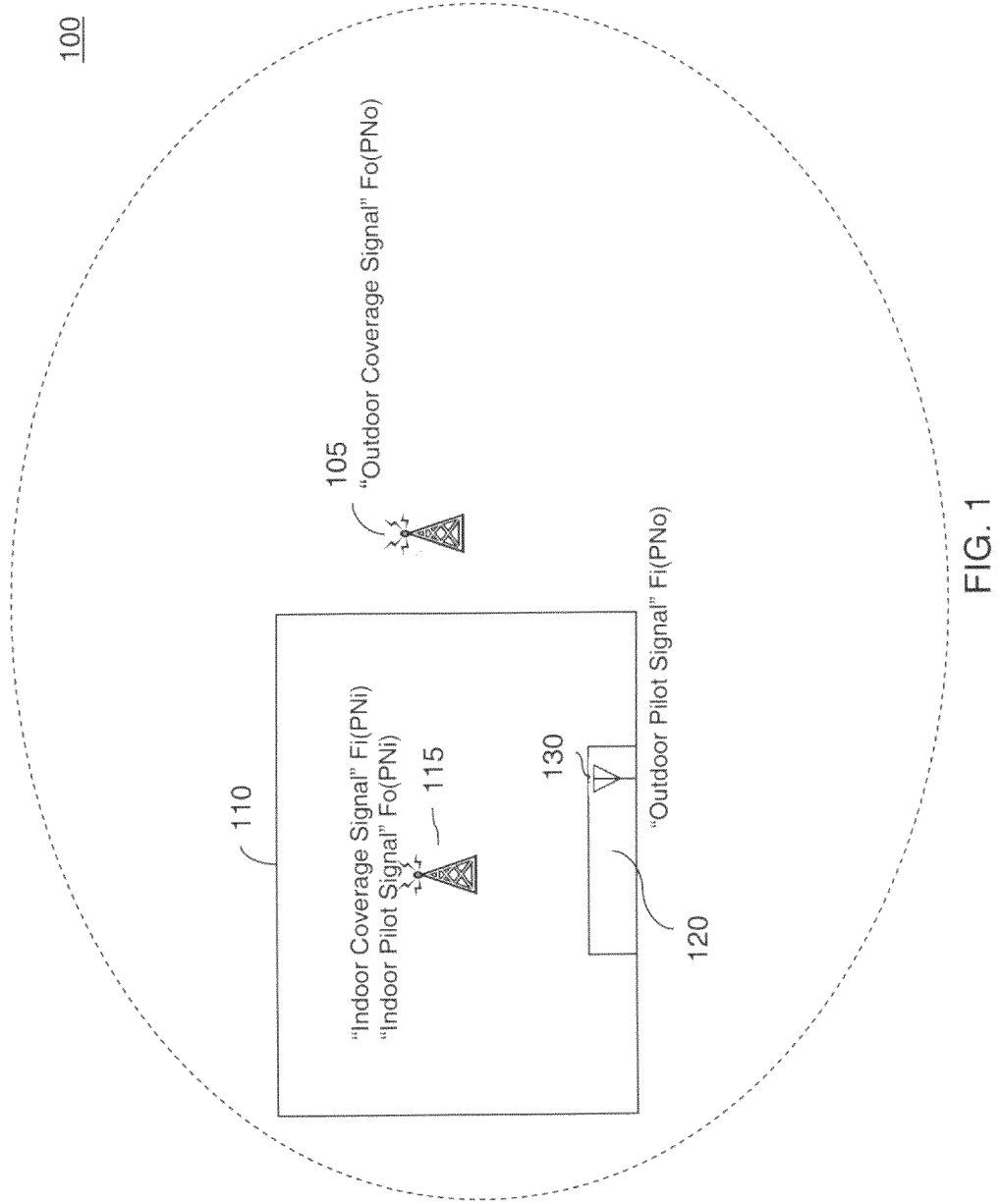
- FIG. 1 illustrates a communication system according to an example embodiment of the present invention.

FIG. 1 illustrates a communication system 100 according to an example embodiment of the present invention. As shown in FIG. 1, the communication system 100 includes an outdoor base station 105, a building 110 and an indoor base station 115 positioned within the building 110. Methods of determining positions for the indoor base station 115 and the outdoor base station 105 so as to optimize a coverage area within which mobile users may be served (e.g., within the building 110 served by the indoor base station 115, outside of the building 110 served by the outdoor base station 105, etc.) are well-known in the art, and will not be described further for the sake of brevity. As shown in FIG. 1, "i" denotes an indoor signal and "o" denotes an outdoor signal, Fi denotes an indoor coverage carrier (e.g., an "indoor" coverage channel or frequency band) and the Fo denotes an outdoor coverage carrier (e.g., an "outdoor" coverage channel or frequency band). Also, PNi denotes an indoor PN offset and PNo denotes an outdoor PN offset.

In the example of FIG. 1, the channels, or carriers, used for indoor and outdoor coverage are different and the inter-frequency handoff between the indoor carrier and the outdoor carrier is not enabled. Because CDMA signals having different channels, or different carriers, are physically isolated (e.g., signals on different channels typically do not interfere with each other), an outdoor signal may not pollute an indoor signal, even if a strength of the outdoor signal is much higher than the indoor signal. For example, at a higher floor of the building 110, if an outdoor signal is received at a relatively high power level, the indoor signal may remain relatively pure such that the Ec/Io of the indoor signal may be maintained at a high level. Thus, a dominant pilot may be established (e.g., as opposed to having the indoor/outdoor pilot signals in competition at different positions within the building 110 based only upon their respective power levels, as in the conventional art) and the call within the indoor area may remain stable throughout the building 110 (e.g., even near higher floor windows).

In order to maintain the call performance, the inter-frequency handoff between the indoor carrier and outdoor carrier is not enabled. Otherwise, if the inter-frequency handoff is activated, the mobile may perform the inter-frequency search and inter-frequency handoff when the mobile is near the window. Thus, the area near the window becomes the handoff area and the mobile may make inter-frequency handoffs back and forth between the indoor and outdoor base stations, which may make calls unstable, and may lead to dropped calls. Accordingly, in example embodiments of the present invention, it is assumed that the inter-frequency handoff for indoor and outdoor base stations is not enabled.

Further shown in FIG. 1 is a building access point 120 within the building 110. The building access point 120 may be representative of an entrance/exit point or points where people (e.g., mobile users) may enter and/or exit the building. In the example embodiment of FIG. 1, a first indicating pilot signal is located on the channel Fi, and has a pilot PN offset of PNo. Thus, the first indicating pilot signal will hereinafter be referred to as Fi(PNo). The pilot antenna 130 transmits the first indicating pilot signal Fi(PNo). The pilot antenna 130 is positioned within, or at least in close proximity to, the building access point 120. A position and orientation of the pilot antenna 130 is configured such that a strength of the first indicating pilot signal Fi(PNo) increases from an interior of the building 110 to an exterior of the building 110 with respect to the building access point 120.

In the example embodiment of FIG. 1, a second indicating pilot signal is located on the channel Fo, and has a pilot PN offset of PNi. Thus, the second indicating pilot signal will hereinafter be referred to as Fo(PNi). The second indicating pilot signal Fo(PNi) is generated/transmitted by the indoor base station 115. Accordingly, it will be appreciated that even if a mobile is active near a window of the building 110 and idle at the outdoor channel, the mobile will handoff to the indoor base station 115 if the user of the mobile moves further inwards the building 110. Further, after the mobile handoff to the indoor signal, the mobile typically will not perform a handoff back to the outdoor base station 105 except within an area in proximity to the building access point 120, which is dominated by the first indicating pilot signal Fi(PNo) transmitted by the pilot antenna 130. The mobile is not likely to detect the outdoor signal transmitted by the outdoor base station 105 near a higher floor window of the building 110 because the indoor and outdoor base stations 115/105 use different carriers and, inter-frequency handoff is not enabled.

Conventionally, both indoor and outdoor CDMA signals are transmitted on the same channel or carrier, and different pilot PN offsets are assigned to distinguish between different base stations or sectors. However, example embodiments of the present invention are directed to an assignment of different channels or carriers for indoor and outdoor coverage areas. Under CDMA protocols, a mobile will typically not perform an inter-frequency search (e.g., a search for a handoff base station in a frequency other than a current frequency) if an inter-frequency handoff mode is not enabled between the two different channels or carriers. Accordingly, with the channel assignments of the first and second indicating pilot signals in the example embodiment of FIG. 1, a mobile is more likely to maintain a connection with the indoor base station 115 near windows, for example, as opposed to handing off to the outdoor base station 105 in such situations, because the mobile does not search for or detect the outdoor signal even if the strength of the outdoor signal is higher than the indoor signal. Furthermore, the first and second indicating pilot signals are provided to support the handoff between the indoor and outdoor base stations 115/105 substantially at the building access point 120 (e.g., as opposed to, for example, "window" areas within the building 110).

As discussed above, the first indicating pilot transmitted by the pilot antenna 130 has the same pilot PN as the outdoor base station while the channel is the same as the indoor base station. Such a configuration allows a mobile to detect a pilot signal with the outdoor pilot PN if the user is exiting the building 110 through the building access point 120. The second indicating pilot transmitted by the indoor base station 115 has the same pilot PN as the indoor signal, but transmits on the same channel or carrier as the outdoor signal. Thus, a mobile may detect a pilot signal with the indoor pilot PN if the user of the mobile is entering the building 110 through the building access point 120. Accordingly, pilot pollution within the building 110 is reduced, because different carriers are used for indoor and outdoor coverage, while maintaining the smooth handoff between indoor and outdoor base station 115/105.

In other words, referring to the example embodiment of FIG. 1, if a mobile user is being served by the indoor base station 115, the mobile user will maintain base stations in its active set having a pilot signal sent on the same channel or carrier as currently serving base station. Thus, assuming the mobile user is being served by the indoor base station 115, the mobile user will not detect the "outdoor" pilot signal transmitted by the outdoor base station 105 because the inter-frequency search/handoff is not enabled. Alternatively, assuming the mobile user is being served by the outdoor base station 105, the mobile user will not detect the "indoor" pilot signal transmitted by the indoor base station 115. Instead, an indoor-served mobile user will only detect the first indicating pilot signal, transmitted by the pilot antenna 130, as indicative of the outdoor base station 105 (i.e., instead of the outdoor pilot signal). Thus, near higher-floor windows, the mobile user ignores the outdoor pilot signal sent by the outdoor base station 105, and the first indicating pilot signal, transmitted by the pilot antenna 130 to "fool" the mobile user into thinking it is being sent by the outdoor base station, is likely too weak to be dominant in such areas.

Figure 2:
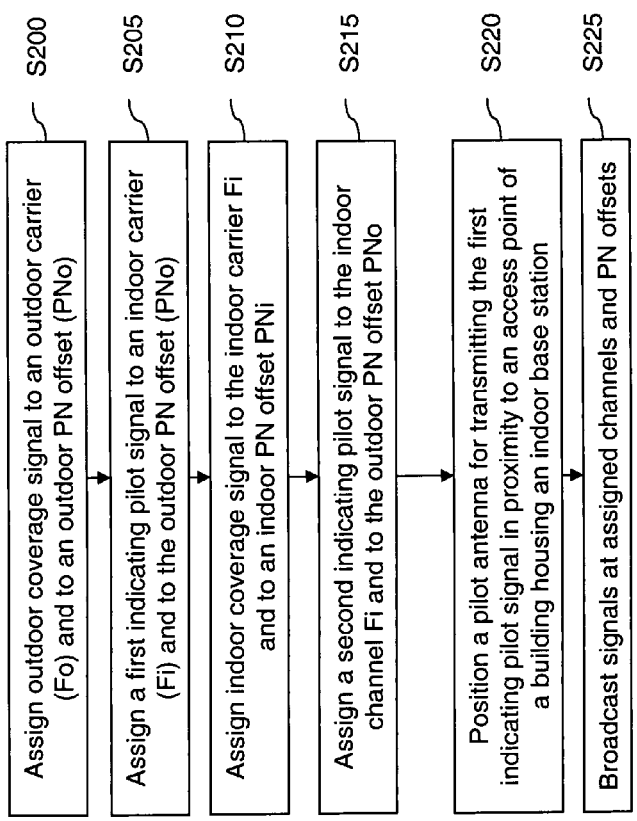
FIG. 2 illustrates a process of configuring indoor and outdoor coverage signals and indoor and outdoor pilot signals within the communication system of FIG. 1 according to an example embodiment of the present invention.

FIG. 2 illustrates a process of configuring indoor and outdoor coverage signals and indoor and outdoor pilot signals within the communication system 100 of FIG. 1 according to an example embodiment of the present invention. While the example embodiment of FIG. 2 is described below with respect to the communication system 100 of FIG. 1, it will be appreciated that the process of FIG. 2 may alternatively be performed within any CDMA based communication system having an outdoor base station and an indoor base station.

In step S200 of FIG. 2, a system designer assigns an outdoor channel (Fo) and an outdoor pseudo-random noise (PN) offset (PNo) to an outdoor coverage signal of the outdoor base station 105. The outdoor channel to which the outdoor coverage area is assigned refers to a distribution carrier frequency, bandwidth or frequency range upon which a base station and mobile user may communicate. Next, in step S205, the same or different system designer assigns an indoor channel (Fi), other than the outdoor channel Fo, and an indoor PN offset (PNi), other than the indoor PN offset PNo, to an indoor coverage signal Fi(PNi) associated with the indoor base station 115.

In step S210 of FIG. 2, the system designer assigns the indoor channel Fi and the outdoor PN offset PNo as a first indicating pilot signal Fi(PNo) (described above in greater detail with respect to FIG. 1), which is transmitted by the pilot antenna 130. In an example, to reduce the hardware cost, the signal Fi(PNo) may be alternatively generated/transmitted by the indoor base station 115, and then transferred to the pilot antenna 130 for transmission or retransmission. In step S215, the system designer assigns the outdoor channel Fo and the indoor PN offset (PNi) as the second indicating pilot signal Fo(PNi). Accordingly, the second indicating pilot signal Fo(PNi) is configured to cover the indoor area of the building 110 in conjunction with the indoor coverage signal Fi(PNi). In an example, the second indicating pilot signal Fo(PNi) is configured to be transmitted by the indoor base station 115 at the assigned outdoor channel Fo and indoor PN offset PNi.

In step S220, the pilot antenna 130 is positioned within, or at least in proximity to, the building access point 120. In particular, the pilot antenna 130 is positioned so as to transmit the first indicating pilot signal Fi(PNo) in an "inward" direction, such that the strength of the first indicating pilot signal Fi(PNo) increases from indoor to outdoor as mobile users approach the building access point 120 to exit the building 110.

In step S225 of FIG. 2, each of the indoor base station 115, the outdoor base station 105 and the outdoor pilot signal 130 transmits their respective signals. Accordingly, the outdoor base station 105 transmits the outdoor coverage signal at the assigned channel Fo and the PN offset PNo (e.g., as assigned in step S200), the pilot antenna 130 transmits first indicating pilot signal Fi(PNo) at the assigned indoor channel Fi and outdoor PN offset PNo (e.g., as assigned in step S210), the indoor base station 115 transmits the indoor coverage signal Fi(PNi) at the assigned indoor channel Fi and indoor PN offset PNi (e.g., as assigned in step S205) and the indoor base station 115 also transmits the second indicating pilot signal Fo(PNi) at the assigned outdoor channel Fo and indoor PN offset PNi (e.g., as assigned in step S215). Generally, all signals generated by the indoor base station 115 are transmitted so as to cover an entirety of the indoor coverage system or interior of the building 110.

Examples of Call Handoffs Between Indoor and Outdoor Base Stations

Example implementations of call handoffs of a representative mobile user between the indoor base station 115 and the outdoor base station 105 will now be described below with respect to FIGS. 3 and 4 with reference to the communication system 100 of FIG. 1 configured as described above with respect to the process of FIG. 2.

Figure 3:
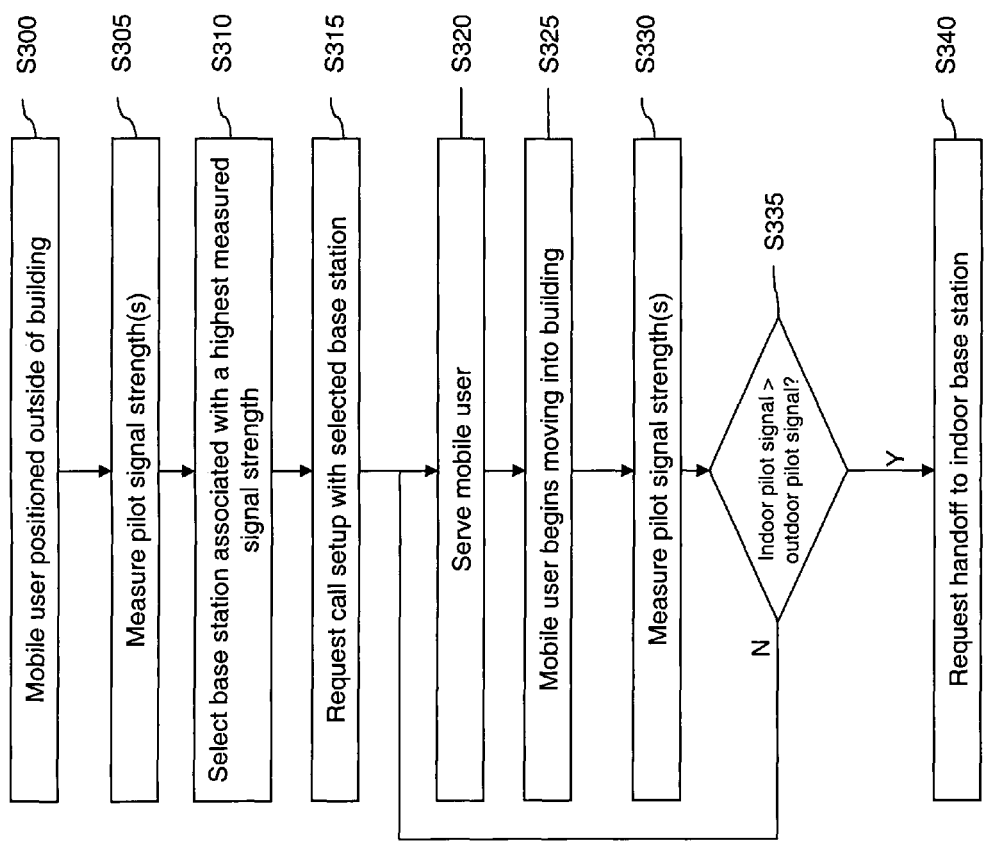
FIG. 3 illustrates a call handoff request process performed as a mobile user enters a building with the communication system of FIG. 1 according to an example embodiment of the present invention.

FIG. 3 illustrates a call handoff request process performed as a mobile user enters the building 110 with the communication system 100 of FIG. 1 according to an example embodiment of the present invention.

In the example embodiment of FIG. 3, assume that the mobile user is initially positioned outside of the building 110 and is being served by the outdoor base station 105 on the outdoor coverage signal, which operates at Fo(PNo).

In step S325, the mobile user begins to enter the building 110 through the building access point 120. In step S330, the mobile user measures signal strengths of all pilot signals on the outdoor frequency Fo (e.g., the outdoor coverage signal Fo(PNo) and the second indicating pilot signal Fo(PNi)). For purposes of description of this example embodiment, assume that the mobile only searches for pilots on the current carrier Fo. In other words, within the communication system 100, the mobile does not enable an inter-frequency mode such that the mobile does not search for pilot signals within different carriers. Thus, for example, if the mobile is served by the outdoor base station 105 with the outdoor coverage signal Fo(PNo), the mobile will search for pilots (e.g., to populate its active set) on the outdoor carrier Fo, and not the indoor carrier Fi. The mobile may, however, detect the second indicating pilot signal Fo(PNi), which is assigned the outdoor channel (Fo) and the indoor pilot PNi. As discussed above, the second indicating pilot signal Fo(PNi) is generated by the indoor base station 115 to "fool" mobiles into acting as if an outdoor CDMA coverage area extends within the indoor area of the building 110 with the same frequency as the outdoor coverage. In step S335, if the measured signal strength of the second indicating pilot signal (e.g., the "indoor" pilot signal transmitted by the indoor base station 115) is greater than the measured signal strength of the outdoor pilot signal (e.g., transmitted by the outdoor base station 105), the process advances to step S340. Otherwise, the process returns to step S320 and the outside base station 105 continues to serve the mobile user. In step S340, the mobile user requests a handoff from the outdoor base station 105 to the indoor base station 115.

As described above, the second indicating pilot signal Fo(PNi) is transmitted so as to cover an interior of the building 110, such that a strength of the second indicating pilot signal Fo(PNi) is greater as a mobile user enters the building 110 via the building access point 120. Thus, it will be appreciated that as the mobile user continues to move towards, and into, the building 110 through the building access point 120 in step S325, the measured signal strength of the indoor pilot signal will soon exceed the measured signal strength of the outdoor pilot signal. At this point, in step S340, the mobile requests a handoff to the indoor base station 115 because the indoor pilot signal Fo(PNi) is stronger than the outdoor coverage signal Fo(PNo). However, it is known at the network that only the indoor pilot channel operates within the outdoor carrier or channel Fo for the indoor base station 115, so the network handoff algorithm escalates the handoff request to a higher level (e.g., CDMA semi-soft or hard handoff). The network will typically direct the mobile to perform inter-frequency handoff to the indoor coverage signal. Thus, in this manner, the indoor indicating pilot signal supports a "smooth" handoff from the outdoor base station 105 with the outdoor coverage signal Fo(PNo) to the indoor base station 115 with the indoor coverage signal Fi(PNi) through a detection of the indoor pilot signal, or second indicating pilot signal, Fo(PNi).

Figure 4:
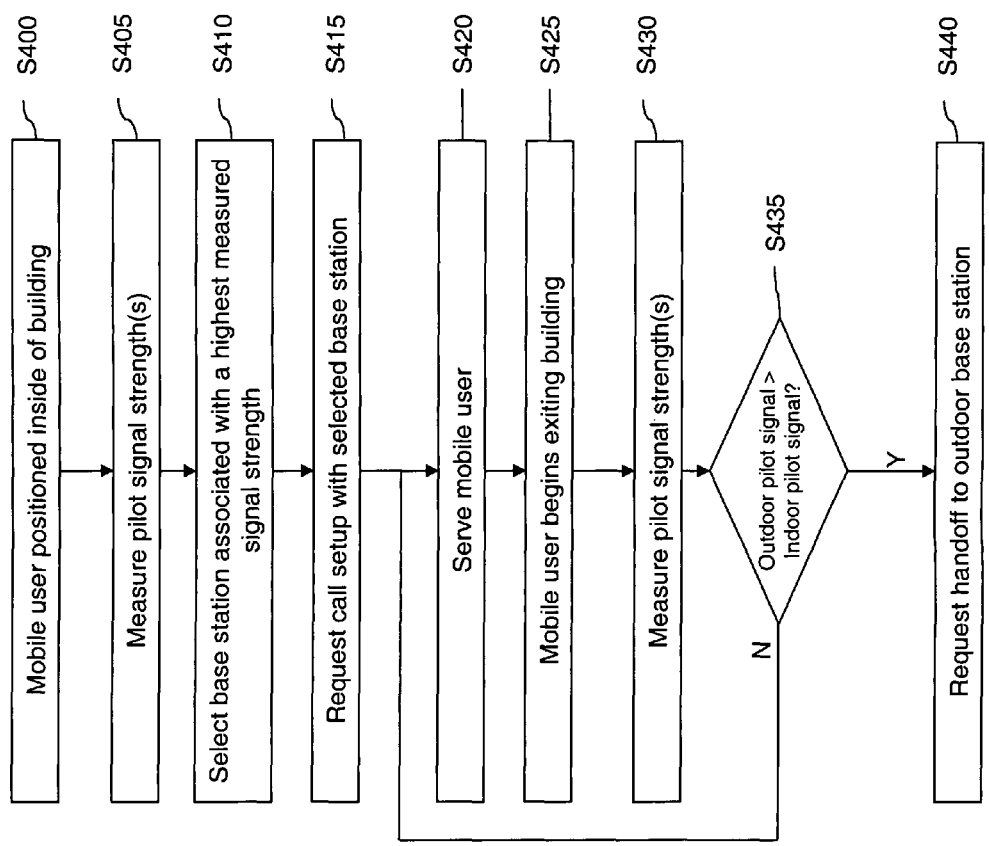
FIG. 4 illustrates a call handoff request process performed as a mobile user exits the building with the communication system of FIG. 1 according to an example embodiment of the present invention.

FIG. 4 illustrates a call handoff request process performed as a mobile user exits the building 110 with the communication system 100 of FIG. 1 according to an example embodiment of the present invention.

In the example embodiment of FIG. 4, assume that the mobile user is initially positioned inside of the building 110 and is being served by the indoor base station 115 on the outdoor coverage signal, which operates at Fi(PNi).

In step S425, the mobile user begins to exit the building 110 through the building access point 120. In step S430, the mobile user measures signal strengths of all pilot signals operating on the indoor frequency Fi. Thus, the mobile user detects and measures the indoor coverage signal Fi(PNi) and the first indicating pilot signal Fi(PNo). As mentioned above, assume that the mobile only searches for pilots on carriers upon which a currently serving base station is transmitting (e.g., in this case, Fi). In other words, within the communication system 100, inter-frequency pilot signal searching, and the mobile does not search for pilot signals within different carriers. Thus, for example, if the mobile is served by the indoor base station 115 with the indoor coverage signal Fi(PNi), the mobile will search for pilots (e.g., to populate its active set) on the indoor carrier Fi, and not the outdoor carrier Fo. However, the mobile user may detect the first indicating pilot signal Fi(PNo), which is assigned the indoor channel or carrier and outdoor pilot PNo. In step S435, if the measured signal strength of the first indicating pilot signal Fi(PNo) is greater than the measured signal strength of the indoor pilot signal Fi(PNi), the process advances to step S440. Otherwise, the process returns to step S420 and the indoor base station 115 continues to serve the mobile user. In step S440, the mobile user requests a handoff from the indoor base station 115 to the outdoor base station 105.

As described above, the pilot antenna 130 transmits the outdoor pilot signal or first indicating pilot signal Fi(PNo) "inwards" (e.g., such that a signal strength of the Fi(PNo) pilot increases from indoor to outdoor) from the building access point 120. Thus, it will be appreciated that as the mobile user continues to exit the building 110 through the building access point 120 in step S425, the measured signal strength of the first indicating pilot signal Fi(PNo) will soon exceed the measured signal strength of the indoor coverage signal Fi(PNi) (see steps S430 and S435 of FIG. 4). At this point, the mobile may request a handoff to the outdoor base station 105 (e.g., because the first indicating pilot signal Fi(PNo) acts as a dummy pilot signal to fool the mobile user into treating the dummy signal as if it was sent from an actual base station). However, it is known at the network that the outdoor base station 105 provides coverage within the outdoor carrier Fo, and only the pilot channel for the first indicating pilot signal Fi(PNo) operates under the indoor carrier Fi. Thus, the network handoff algorithm escalates the handoff request to a higher level (e.g., CDMA semi-soft or hard handoff). The network will typically direct the mobile to perform inter-frequency handoff to the outdoor coverage signal. Thus, in this manner, the outdoor or first indicating pilot signal supports a "smooth" handoff from the indoor base station 115 with the indoor coverage signal Fi(PNi) to the outdoor base station 105 with the outdoor coverage signal Fo(PNo) through a detection of the outdoor pilot signal, or first indicating pilot signal Fi(PNo).

Example embodiments of the present invention being thus described, it will be obvious that the same may be varied in many ways. For example, while above-described with respect to "interior" and "exterior" spaces, it is understood that interior and exterior may be interpreted broadly. For example, "interior" does not necessarily imply a sealed space, but rather may apply to any type of enclosed area, such as a garage, warehouse, etc., with relatively large openings to an outside region.

Further, example embodiments of the present invention may be applied to any desired partitioning of space, and not necessarily an indoor/outdoor partition. For example, if a small island is located in proximity to a large city, an "indoor" pilot antenna and an "outdoor" pilot antenna may be positioned at a point of the island closest to the city, with the "indoor" pilot antenna radiating a pilot signal towards the island (e.g., a pilot signal of an "indoor" base station, or base station serving the island) and the "outdoor" pilot antenna radiating a pilot signal towards the city (e.g., a pilot signal associated with an "outdoor" base station, or base station serving a portion of the city). Thus, a probability of a mobile user on the island requesting call setup to the "outdoor" base station serving the city may be reduced (e.g., reducing a "dropped call" occurrence as the island mobile user moves to a different position on the island).

Further, while above-described example embodiments of the present invention have been generally described as being directed to CDMA, it is understood that other example embodiments of the present invention may be directed to any well-known CDMA based wireless communication protocol (e.g., WCDMA, UMTS, EVDO, etc.).

Further, while the building access point 120 is described above as only including an "outdoor" pilot antenna 130, it is understood that other example embodiments of the present invention could setup another "indoor" pilot antenna and need not include the indoor/outdoor pilot antennas in the same general region. In other words, above-described example embodiments assume that the building access point 120 includes both an entrance and an exit, but other buildings may separate entrances and exits. Thus, in an example, in a building with separate and isolated entrances and exits, the indoor pilot antenna may be positioned at an "entrance" of the building and the "outdoor" pilot antenna 130 may be positioned at an exit of the building, so as to facilitate smooth call handoffs and/or call setups. Thus, in buildings with non-adjacent entrances and exits, additional pilot antennas may be deployed to reduce pilot pollution and ensure smooth handoff/setup at each exposed area.

Such variations are not to be regarded as a departure from the example embodiments of the invention, and all such modifications are intended to be included within the scope of the invention.

We claim:

1. A method of pilot signal transmission within a wireless communications system, comprising:

first transmitting, by a first base station, a first signal having a first frequency and a first pilot offset for a first coverage area;

second transmitting, by a second base station, a second signal having a second frequency and a second pilot offset for a second coverage area, the second frequency being different from the first frequency, the second pilot offset being different from the first pilot offset;

third transmitting, by a pilot antenna, a first indicating pilot signal having the second frequency and the first pilot offset for supporting handoff from the second base station to the first base station, a portion of the second coverage area overlapping with a portion of the first coverage area; and fourth transmitting, by the second base station, a second indicating pilot signal having the first frequency and the second pilot offset for supporting handoff from the first base station to the second base station.

2. The method of claim 1, wherein inter-frequency handoff is not enabled between the first signal and the second signal.

3. The method of claim 1, wherein the first base station is an outdoor base station and the second base station is an indoor base station.

4. The method of claim 1, wherein the pilot antenna is positioned within a building access point.

5. The method of claim 4, wherein the building access point is one of an entrance and an exit of a building.

6. The method of claim 1, wherein the wireless communications system operates in accordance with one of code division multiple access (CDMA) protocols, universal mobile telecommunication system (UMTS) protocols and evolution data optimized (EVDO) protocols.

7. The method of claim 1, wherein the first indicating pilot signal is transmitted into a portion of the second coverage area such that a signal strength of the first indicating pilot signal increases as the portion is traversed from the second coverage area to the first coverage area.

8. The method of claim 1, further comprising:

receiving, by the second base station, a request from a mobile station to handoff to the second base station from the first base station if a measured signal strength of the second indicating pilot signal is greater than a measured signal strength of the first signal.

9. The method of claim 1, further comprising:

receiving, by the first base station, a request from a mobile station to handoff to the first base station from the second base station if a measured signal strength of the first indicating pilot signal is greater than a measured signal strength of the second signal.

* * * * *